United States Patent

Orris

[11] 3,850,421
[45] Nov. 26, 1974

[54] CLAMP APPARATUS
[76] Inventor: Robert M. Orris, Rd. No. 3, Box 379, Greensburg, Pa. 15601
[22] Filed: Apr. 23, 1973
[21] Appl. No.: 353,377

[52] U.S. Cl. .................. 269/91, 24/263 A, 269/88
[51] Int. Cl. ........................ B23q 3/02, B25b 5/10
[58] Field of Search .................. 269/88, 91–94, 269/212, 215, 218, 321 ME; 24/263 A

[56] References Cited
UNITED STATES PATENTS

| | | | |
|---|---|---|---|
| 1,815,414 | 7/1931 | Lord | 269/93 |
| 2,803,277 | 8/1957 | Gamura | 269/93 |
| 3,071,368 | 1/1963 | Harding | 269/218 X |
| 3,380,730 | 4/1968 | Carver | 269/94 X |
| 3,623,718 | 11/1971 | Thomeczek, Sr. | 269/91 |
| 3,687,441 | 8/1972 | Anderson | 269/91 |

*Primary Examiner*—Roy Lake
*Assistant Examiner*—Neil Abrams
*Attorney, Agent, or Firm*—Brown, Murray, Flick & Peckham

[57] ABSTRACT

A clamp apparatus made up of a clamp bar engageable at one end with a workpiece to be held upon a table of a machine tool or the like. A bolt passes through a slot in the bar and into a T-nut located in a T-slot in the table or alternatively into a threaded hole provided in the table. The bolt has a washer at its head end for engaging the bar to develop a clamping force by torque applied to the bolt. A compression rod is adjustably positioned in the slot at the end of the bar remote from the workpiece. The compression rod has flat, load-bearing surfaces formed by radially extending teeth spaced at regular intervals along the length of the rod which engage complementary-shaped teeth formed in the wall defining the slot in the bar. A second form of clamp apparatus includes two clamp bars for engaging at one of their ends opposed surfaces of a workpiece. A bolt passing through the slot in each bar is used to develop a clamping force by the use of threaded nuts. A compression rod is adjustably located in the grooved slots in each bar.

7 Claims, 5 Drawing Figures

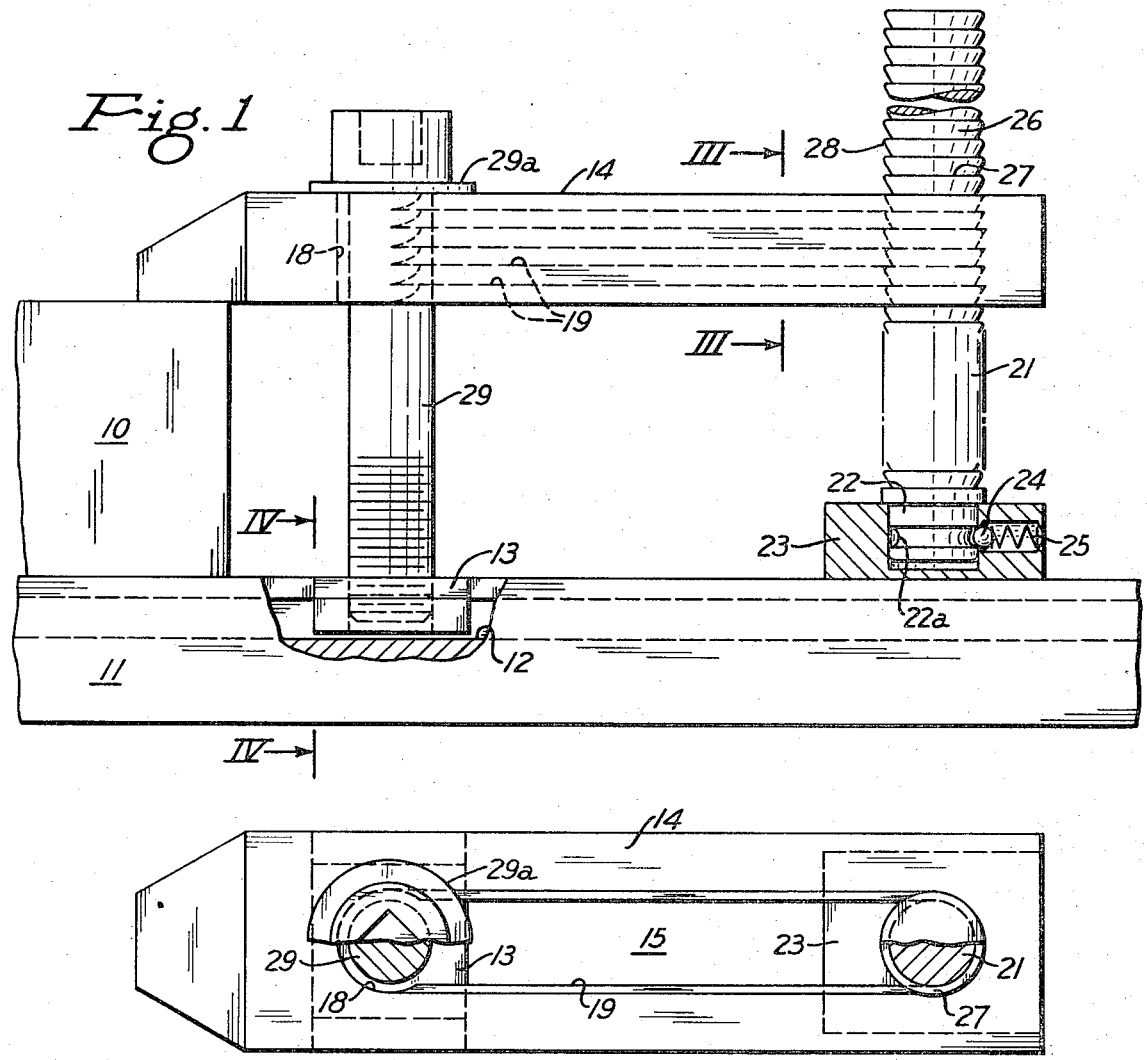
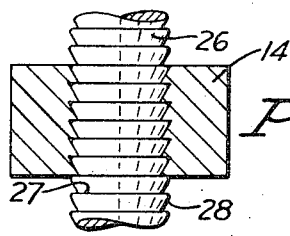
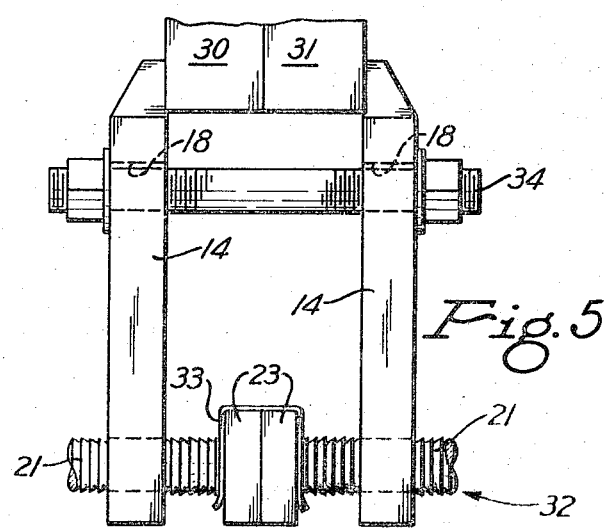

CLAMP APPARATUS

BACKGROUND OF THE INVENTION

This invention relates to a clamp apparatus for workpieces and other objects which are to be held in a desired location by a compression force developed by the clamp apparatus.

Many types of the machine tools usually require the use of one or more bar clamps in order to hold a workpiece at a desired location while the workpiece undergoes machining operations. Typically, the practice of clamping a workpiece to a machine tool occurs in machine shops although it is carried out in wood working and many other industries. In the past, these clamps have taken the form of a bar of metal positioned so that one end thereof engages the workpiece while supported on a table. One or a system of blocks were used to form a "heel" to support the extended end of the bar so that is extends in a nearly parallel relation with the support table for the workpiece. A bolt or some other fastening means was then positioned through a hole or opening provided in the bar from where the bolt was received in a threaded hole in the table. By applying a torque to the bolt, a desired clamping force could be developed between the bar and the table provided that properly dimensioned heel blocks were selected to bear the compressive force acting thereon.

The use of such a clamping arrangement has been time consuming and complicated by the need to select a proper size of block or blocks to serve as the heel for the clamp. Usually this selection was dictated by the actual dimension that separated the workpiece surface to receive the clamp from the table. Therefore, it was necessary to provide a number of heel blocks of different sizes which must be always available for use separately or in various combinations in order to achieve the desirable dimensioned heel block. Moreover, the time and number of separate parts required to put clamps of this nature into operation is compounded by the usual practice of employing several clamps in order to hold a given workpiece securely to the table of a machine tool or the like.

SUMMARY OF THE INVENTION

It is an object of the present invention to provide a clamping apparatus for the development of a clamping force upon a workpiece without the time-consuming use of numerous heel blocks which were heretofore required to accommodate various dimensioned workpieces.

It is a further object of the present invention to provide an improved clamping apparatus having an adjustable compression member for resisting the clamping force developed by the use of the clamp apparatus for holding the workpiece to a load-bearing support surface.

In one form of the present invention, there is provided a clamping apparatus for holding a workpiece in a desired location upon a load-bearing surface comprising: a clamp bar having a workpiece engaging surface at one end, an internal slot extending along a predetermined length of the bar, spaced-apart and parallel teeth formed in the walls defining the slot, the teeth terminating at the end of the bar adjacent the workpiece engaging surface by the formation of an enlarged dimension to the slot, a compression rod having radially-extending parallel teeth spaced at regular intervals in planes perpendicular to the longitudinal axis of the rod for mating engagement with the teeth formed in the slot of the bar, and bolt means extending through the enlarged end of the slot and into the workpiece support member for developing a clamping force transmitted to the workpiece by the clamp bar and which force is resisted by the compression rod.

In the preferred form, the compression rod is provided with a heel plate on the end engageable with the workpiece support surface. The preferred form further includes a particular design of interconnecting surfaces between the bar clamp and the compression rod which consists of flat load-bearing surfaces projecting radially from the compression rod, each terminated by an intersecting radial surface inclined to the load-bearing surface.

In the second form of the present invention, there is provided a clamping apparatus comprising two clamping bars which are arranged at opposed sides of the workpiece to receive a clamping force, a compression rod adjustably positioned in a slot formed in at least one of the clamp bars for engagement with the other of the clamp bars, and bolt means extending between the clamp bars for developing a clamping force applied to the workpiece by the bars and resisted by the compression rod.

These features and advantages of the present invention as well as others will be more apparent when the following description is read in light of the accompanying drawings, in which:

FIG. 1 is an elevational view of one embodiment of the present invention;

FIG. 2 is a plan view, partly in section, of the clamp apparatus shown in FIG. 1;

FIG. 3 is a sectional view taken along line III—III of FIG. 1;

FIG. 4 is a sectional view taken along line IV — IV of FIG. 1; and

FIG. 5 is a plan view of a clamp apparatus according to the second embodiment of the present invention.

With reference now to FIGS. 1–4, there is shown a clamp apparatus for holding a workpiece 10 securely upon a table 11 of a machine tool which may be in the form of a surface grinder, a milling machine and like tools for machining surfaces of the workpiece. The table 11 has a T-slot 12 (FIG. 4) conventionally provided for use with many different forms of fixtures including the clamp apparatus of the present invention for holding the workpiece securely in a desired position on the table, and a T-nut 13 is held captive in the T-slot. In certain cases, however, any one of a number of tapped holes usually provided in such tables, may be used with the clamp apparatus.

An elongated clamp bar 14 has one end engageable with the workpiece. Between the terminal ends of the clamp bar there is provided an internal slot 15 extending through the bar along a predetermined length of the bar. A plurality of spaced-apart parallel teeth 19 project from the wall defining the slot 14. The clamp bar, at one end of the slot, has an enlarged circular opening 18. A compression rod 21 has a diameter selected so that is passes through the opening 18. The compression rod has a cylindrical end 22 provided with a recess 22a. A heel plate 23 has an opening to receive the cylindrical end 22 of the compression rod which is held within the plate 23 by a ball 24 urged into the recess 22a by a spring 25. The heel plate 23 may have a square profile shape as shown in FIG. 2 or, if desired, it may be formed with a rectangular or round profile shape.

The compression rod has radially extending, parallel teeth 26 defining flat load-bearing surfaces 27, each of which has an outward terminal edge formed by an intersecting inclined radial surface 28. The teeth 26 are further characterized by lying in planes that are perpendicular to the longitudinal axis of the compression rod for mating engagement between the teeth 19 and 26, when certain of the teeth 26 are located in the opening 18 of the bar.

The clamp apparatus is assembled by first positioning the bar 14 into engagement with the workpiece so that the bar extends substantially parallel with the table. The compression rod 21 is then inserted through the opening 18 and into the heel plate 23. Following this, the compression rod is displaced along the slot thereby engaging the teeth 19 with the teeth 26. This displacement of the rod continues to the end of the slot shown in FIG. 1 where the mating engagement of the teeth contact each other for approximately 180° of the bar. A standard bolt 29 is then inserted into the opening 18 where a washer 29a engages the top surface of the bar 14, and the threaded end of the bolt is received in the T-nut 13 or, if desired, the bolt may be threaded into a tapped hole formed in the table. The desired clamping force is then established by applying a torque to the bolt which develops a compressive force upon the workpiece 10 between the table 11 and one end of the bar 14 while the reactive compressive force is resisted by the rod 16 at the end of the bar remote from the workpiece. An efficient transfer of the reactive compressive force is made possible by the use of a plurality of mating teeth 19 and 26 and particularly by designing the teeth with flat load-bearing surfaces.

FIG. 5 illustrates a second embodiment of the present invention wherein two workpieces 30 and 31 are clamped together through the use of two of the above described clamp bars 14 arranged at opposite sides of the workpieces. The clamp bars 14 are of the same form and construction as that previously described. A compression rod 32 is formed by connecting together, either mechanically or by welding, the cylindrical end 22 of two of the compression rods 21 shown in FIG. 1. As shown in FIG. 5, the heel plates 23 for each of the compression rods 21 are abutted together and held in their position by a U-shaped spring clip 33. After positioning the compression rod 32 in the same position as described with regard to FIG. 1, a threaded stud 34 is positioned in the openings 18. A nut and washer on each end of the stud are used to develop a compressive force to hold the workpieces 30 and 31 together.

Although the invention has been shown in connection with certain specific embodiments, it will be readily apparent to those skilled in the art that various changes in form and arrangement of parts may be made to suit requirements without departing from the spirit and scope of the invention.

I claim:

1. A clamp apparatus comprising, in combination:
   a clamp bar having an elongated slot bounded within a rectangular shape of the clamp bar, said slot extending along a predetermined length of the bar for developing a clamping force upon the clamp bar to hold a workpiece in a desired location upon a load-bearing surface;
   a plurality of parallel and spaced-apart teeth projecting into said slot from said clamp bar, said teeth having terminal ends within said slot at opposite sides thereof to thereby define an enlarged opening extending through said clamp bar;
   a compression rod including a plurality of teeth for mating engagement with the teeth projecting into said slot, said compression rod being constructed for longitudinal positioning within said enlarged opening in the clamp bar and displaced along said slot to bring a plurality of teeth thereof into mating engagement with the teeth projecting into the slot, said teeth of the compression rod being spaced apart and lying in parallel planes that are perpendicular to the longitudinal axis of the compression rod, and
   a clamp bolt constructed to pass through said enlarged opening to the slot in the clamp bar for holding said compression rod captive within said slot while at the same time maintaining mating engagement between said teeth in the slot and a plurality of teeth on the compression rod, said bolt including a stop member at one end thereof for engaging the top surface of the clamp bar, said bolt further including a threaded portion for developing a clamping force upon said clamp bar.

2. A clamp apparatus according to claim 1 further comprising a heel plate for supporting one end of said compression rod upon said load-bearing surface.

3. A clamp apparatus according to claim 2 wherein said heel plate further includes means for detachable connection to said one end of said compression rod.

4. The clamp apparatus according to claim 1 wherein said plurality of teeth of said compression rod are each defined by two intersecting surfaces that form an outer annular edge of a tooth, one surface being a radial surface inclined to the longitudinal axis of the compression rod, and the other surface being a flat load-bearing surface arranged perpendicular to the longitudinal axis of the compression rod.

5. A clamp apparatus comprising, in combination:
   two clamp bars each having an elongated slot bounded within a rectangular shape of each clamp bar, said slot extending along a predetermined length of each bar for developing a clamping force upon a workpiece arranged between the clamp bars;
   a plurality of parallel and spaced-apart teeth projecting into each slot of said clamp bars, said teeth having terminal ends within each slot at opposite sides thereof to thereby define an enlarged opening extending through each of the clamp bars;
   a compression rod including a plurality of teeth for mating engagement with the teeth projecting into the slots formed in each clamp bar, said compression rod being constructed for longitudinal positioning within said enlarged openings in the clamp bars and displaced along said slots to bring a plurality of teeth of the compression rod into mating engagement with the teeth projecting into each slot, the teeth of the compression rod being spaced apart and lying in parallel planes that are perpendicular to the longitudinal axis of the compression rod, and a clamp bolt constructed to pass through the enlarged openings to the slots in each clamp bar for holding said compression rod captive within the slots in each clamp bar while at the same time maintaining mating engagement between the teeth in each slot and a plurality of teeth on the compression rod, said bolt including stop members at each end thereof for engaging the top surfaces of the clamp bars, said bolt further including a threaded portion for developing a clamping force upon a workpiece between said clamp bars.

6. The clamp apparatus according to claim 5 wherein said compression rod is further defined to comprise two compression rod members arranged in an abutting end-to-end relation such that load-bearing surfaces of the teeth on each rod member face in opposite directions.

7. The clamp apparatus according to claim 6 further comprising a heel plate for each of said two compression rod members, and clip means for holding said heel plates in an abutted relation to locate said compression rod members in said end-to-end relation.

* * * * *